Figure 1:
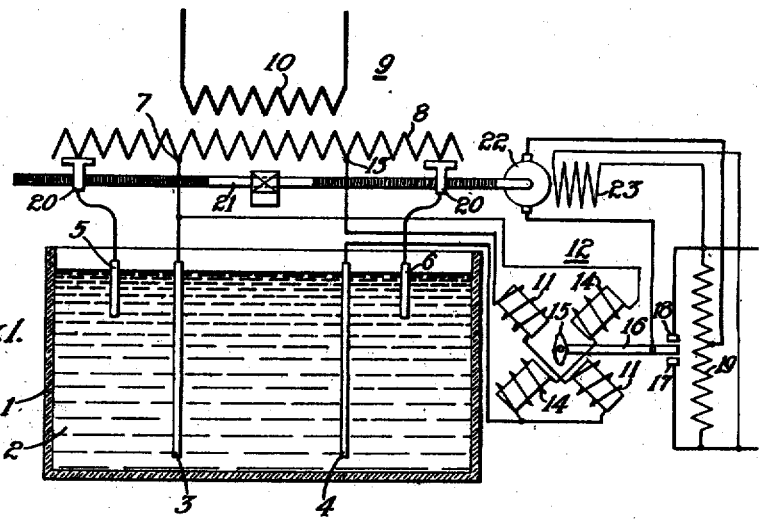

April 1, 1924.

J. SLEPIAN

ELECTROLYTIC CONDENSER

Filed Dec. 30, 1919

1,488,560

WITNESSES:

INVENTOR
Joseph Slepian
BY
ATTORNEY

Patented Apr. 1, 1924.

1,488,560

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER.

Application filed December 30, 1919. Serial No. 348,451.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Condensers, of which the following is a specification.

My invention relates to electrolytic condensers and, more particularly, to condensers of the type formed by employing a plurality of film-forming electrodes immersed in a suitable electrolyte, and it has, for its primary object, the construction of condensers of the above designated type which shall be particularly suitable for application in variable-voltage, alternating-current circuits.

I have found that condensers which are suitable for constant-voltage circuits do not continuously operate satisfactorily when employed in variable-voltage circuits. When the condensers are subjected to a variable voltage, their capacitance changes which, in general, results in a change of power factor and, if the condensers remain unattended for any length of time, with the conditions changing in this manner, the electrodes thereof deteriorate, which soon precludes further use of the condenser.

One object of my invention, therefore, resides in the provision of means for maintaining a substantially constant capacitance and a relatively low value of power factor in an electrolytic condenser connected in a variable-voltage, alternating-current working circuit.

With these and other objects in view, my invention will be more fully described, illustrated in the drawings, in the several views of which corresponding numerals indicate like parts, and then particularly pointed out in the claims.

Figure 2:
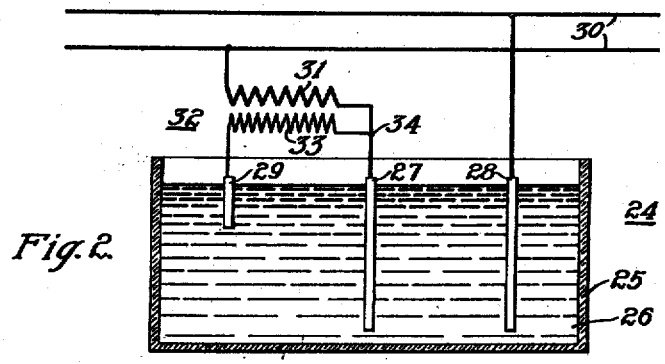
Figure 3:
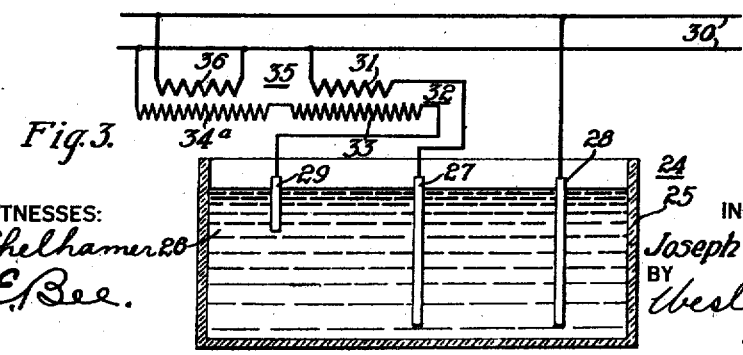

In the drawings, Fig. 1 is a diagrammatic view of an electrolytic condenser provided with additional electrical equipment to maintain its capacitance substantially constant, and Figs. 2 and 3 are similar diagrammatic views of condensers which illustrate a modification of my invention, wherein the capacitance of the condenser is maintained substantially constant by electrical equipment which provides an inherent regulation.

I have found that a satisfactory electrolytic condenser may be constructed by employing additional or auxiliary film-forming electrodes, which are preferably of smaller area than the main electrodes. By impressing a higher potential on the auxiliary electrodes, I have found that the main electrodes may be maintained in good operating condition. The auxiliary electrodes maintain the main electrodes in good operating condition by insuring that the voltage of the main electrodes shall always be positive with respect to the electrolyte. The good results obtained by employing auxiliary electrodes, however, are offset, to a great extent, if the condenser is subjected to a variable voltage. In order to maintain the advantage of the auxiliary electrodes and consequent good operating conditions, I have found that the voltage impressed on the auxiliary electrodes should be varied with variations in the voltage of the supply circuit. The voltage adjustment may be obtained in various ways and, in order to illustrate the application of my invention, I have shown several structures, all of which embody the same general principles. It should be understood that the structures shown and the description thereof apply to electrical conditions wherein the applied voltage is varied but the frequency is constant.

In Fig. 1 is shown a condenser comprising a tank 1 containing a suitable electrolyte 2 in which a plurality of main electrodes 3 and 4 and a plurality of auxiliary electrodes 5 and 6 are immersed. The electrode 3 is connected to a tap 7 on the secondary winding 8 of a transformer 9, the primary winding 10 of which may be connected to an alternating-current supply circuit (not shown). The main electrode 4 is connected through a plurality of series coils 11 of a relay device 12, to another tap 13 on the secondary winding 8. A plurality of voltage coils 14 are connected in parallel relation to the condenser and to the secondary winding 8. The relay device 12 has a vane 15 which is connected to actuate a contact arm 16 that is adapted to engage contact members 17 and 18. The contact members 17 and 18 are respectively connected to terminals of a balance coil 19, which may be connected to a source of direct current (not shown). The auxiliary electrodes 5 and 6 are connected to movable contact members 20 mounted upon a suitably supported feed-screw 21 that is connected to a reversing motor 22. The reversing motor 22 has one armature terminal connected to the contact arm 16 and the other terminal to the mid-point of the balance coil 19. A field winding 23 of the motor 22 is connected across the source of direct current to provide a separate excitation therefor.

An examination of the relay device 12 will disclose that the series coils 11 and the voltage coils 14 tend to establish magnetic fields at right angles to each other, under normal conditions; that is, when the strengths of magnitudes of the fields are substantially the same. When the magnetic fields are at right angles to each other, there is a component force established at 45° to each of the fields, which determines the position of the vane 15 when balanced conditions obtain, as shown in the drawing. Under this condition, the contact arm 16 is supported midway between the contact members 17 and 18, but when normal conditions do not obtain in the condenser, the magnetic fields of the relay device are unequal and cause the vane 15 to move rotatively and thus move the contact arm 16 into engagement with one of the contact members 17 and 18. The direction of rotation of the reversing motor 22 is determined by the connections established by the contact arm 16. When the contact arm is shifted from one contact member to the other contact member, the direction of rotation of the motor 22 is reversed, which determines the direction in which the contact members 20 are moved, the connections of the auxiliary electrodes 5 and 6 to the secondary winding 8 being thus varied.

I have found that the capacitance of an electrolytic condenser, provided with auxiliary electrodes, depends both upon the alternating voltage of the working circuit to which the condenser is connected and upon the amount by which the voltage of the auxiliary electrodes is raised above that of the main electrodes. I have found, in general, that, if the voltage in the working alternating-current circuit is raised, this rise may be compensated for by decreasing the excess voltage between the auxiliary electrodes and the main electrodes. If the excess voltage impressed upon the auxiliary electrodes is properly varied, the capacitance of the condenser may be kept substantially constant, its power factor relatively low and a long life insured. The construction shown in Fig. 1 provides for variations in the voltage impressed upon the auxiliary electrodes, which variations are governed by the relay device 12, which, in turn, is governed by the voltage impressed upon the condenser.

For example, in case of a rise of voltage in the alternating-current working circuit, the contact members 20, which connect the auxiliary electrodes to the secondary winding, should be moved to include a lesser number of turns between the auxiliary electrodes and this adjustment should be continued until the tendency of the capacitance of the condenser to decrease has been obviated. Similarly, in case of a decrease in the impressed voltage, the contact members 20 are moved away from each other, or to include a greater number of turns between the auxiliary electrodes, until there is no tendency for the capacitance of the condenser to increase. It will be appreciated that various means for regulating the connections of the auxiliary electrodes to the secondary winding 8 may be employed to obtain the desired results. For example, the connections of the auxiliary electrodes to the secondary winding may be made permanent and the connections of the main electrodes may be made variable, or all of the connections of the electrodes of the condenser to the secondary winding may be made variable to maintain the desired ratio between the exciting voltage and the impressed or working voltage.

In Fig. 2 is shown a modification of my invention comprising a condenser 24 having a tank 25 containing an electrolyte 26 in which are immersed a plurality of main electrodes 27 and 28, together with an auxiliary electrode 29, all of film-forming material. The electrode 28 is connected to one side of an alternating-current working circuit 30, and the electrode 27 is connected, through a primary winding 31 of a transformer 32, to the other side of the circuit 30. The auxiliary electrode 29 is connected through a secondary winding 33 of the transformer 32, to the electrode 27, as indicated at 34. In the condenser above described, the voltage regulation is inherent and no movable apparatus is required. The excess voltage impressed upon the auxiliary electrode 29 is determined by the current traversing the winding 31 to the main electrode 27.

To understand the conditions that obtain in the condenser shown in Fig. 2, we may consider the specific case of the voltage of the working circuit 30 being doubled. I have found, that, if the voltage impressed upon all parts of a condenser is increased, the capacitance of the condenser varies nearly inversely with the voltage. In this case, therefore, the capacitance of the condenser would be reduced to approximately one-half of its former value, after sufficient time had elapsed for steady conditions to obtain, so that the current traversing the main electrodes would have the same value as before conditions were changed. It is clear, therefore, with the connections shown in Fig. 2, that, since the current in the main electrodes remains substantially constant, the excess voltage impressed upon the auxiliary electrode could not be doubled with the increase of voltage of the working circuit but would have to remain the same as its original value. It will be apparent, therefore, that, although the voltage impressed upon the main electrodes may be doubled, the excess voltage impressed upon the auxiliary electrodes cannot increase in that proportion so that the system reduces the tendency of the condenser to vary in capacitance with a variation in the impressed voltage.

In Fig. 3 the condenser is shown connected to the supply circuit 30 in a similar manner to that shown in Fig. 2. As here shown, the electrode 28 is connected to one side of the supply circuit 30, and the electrode 27 is connected, through the primary winding 31 of the transformer 32, to the other side of the supply circuit. The auxiliary electrode 29, however, is connected, through the secondary winding 33 of the transformer 32, to a secondary winding 34ª of another transformer 35 to the same side of the supply circuit 30 as the main electrode 27. The primary winding 36 of the transformer 35 is connected, in parallel relation, to the supply circuit 30.

As indicated in the drawing, the secondary windings 33 and 34ª are provided with a greater number of turns than their respective primary windings. The turns of the transformer windings are so chosen for a definite ratio of condenser current and impressed voltage that the resultant voltage impressed upon the auxiliary electrode has a zero value. It is obvious that a slight change in the ratio of condenser current and impressed voltage will cause a relatively high voltage to be impressed on the auxiliary electrode 29. The instantaneous directions of the voltage existing in the secondary windings 33 and 34ª are chosen to be such that a decrease in the ratio above mentioned will cause a decrease in the impressed voltage on the auxiliary electrode and that an increase in this ration will increase the voltage impressed thereon.

It is apparent that my invention is not restricted to any particular form of apparatus because the broad principles may be applied by the employment of various structures to accomplish the desired results. My invention broadly comprehends the variation of voltage impressed upon the auxiliary electrodes to compensate for variations of the supply voltage or the voltage impressed upon the condenser and to maintain substantially a constant capacitance in the condenser. As mentioned heretofore, it is understood that the descriptions of the connections of the condenser are intended to be applied to condensers connected in alternating-current circuits in which a substantially constant frequency obtains.

The present application describes an invention which is closely related to that described in my copending application, Serial No. 348,452, on electrolytic condensers, filed December 30, 1919.

Although I have shown and specifically described a plurality of condensers connected in various ways to an alternating-current working circuit to obtain a substantially constant capacitance and good operating conditions, it is obvious that minor changes may be made in the additional electrical equipment and in the connections thereof without departing from the spirit or scope of my invention, and I desire, therefore, that no limitations shall be imposed except such as are indicated in the appended claims.

I claim as my invention:

1. An electrolytic condenser comprising a plurality of main electrodes and a plurality of auxiliary electrodes, all immersed in a suitable electrolyte, means for impressing a higher alternating potential on the auxiliary electrodes than on the main electrodes, and means for varying the excess potential between the auxiliary electrodes and the main electrodes.

2. An electrolytic condenser comprising a plurality of main electrodes, a plurality of auxiliary electrodes, all immersed in a suitable electrolyte, means for impressing a higher potential on the auxiliary electrodes than on the main electrodes, and means for varying the excess potential between the auxiliary electrodes and the main electrodes governed by the potential impressed upon the condenser.

3. An electrolytic condenser comprising a plurality of main film-forming electrodes, a plurality of auxiliary film-forming electrodes, all immersed in a suitable electrolyte, means for impressing a higher alternating potential on the auxiliary electrodes than on the main electrodes, and means for so varying the excess potential between the auxiliary electrodes and the main electrodes as to maintain the capacitance of the condenser substantially constant.

4. The combination with a transformer having its primary winding connected to an alternating-current supply circuit, of an electrolytic condenser comprising a plurality of main electrodes connected to the secondary winding of the transformer, a plurality of auxiliary electrodes so connected to the secondary winding as to include a larger number of turns between the auxiliary electrodes than is included between the main electrodes, and means for varying the number of turns of the secondary winding included between the auxiliary electrodes.

5. The combination with a transformer having its primary winding connected to an alternating-current supply circuit, of an electrolytic condenser comprising a plurality of main electrodes connected to the secondary winding of the transformer, a plurality of auxiliary electrodes so connected to the secondary winding as to include a larger number of turns between the auxiliary electrodes than is included between the main electrodes, and means for varying the number of turns of the secondary winding included between the auxiliary electrodes governed by the voltage impressed on the primary winding of the transformer.

6. The method of maintaining the capacitance of an electrolytic condenser, that is connected to an alternating-current supply circuit having a variable voltage and a substantially constant frequency, substantially constant, that comprises providing means for maintaining the potential of the main electrodes always positive with respect to the electrolyte, said means including an auxiliary electrode and varying the voltage impressed on the auxiliary electrode with changes in the voltage impressed on the condenser.

7. The combination with an electrolytic condenser connected to an alternating-current supply circuit comprising a plurality of main electrodes and an auxiliary electrode, all immersed in a suitable electrolyte, of a plurality of transformers the primary winding of one of which is connected to one of the main electrodes and the primary winding of the other connected in parallel relation to the alternating-current supply circuit and the secondary windings connected in series with each other and to the auxiliary electrode and to the supply circuit.

8. The combination with an electrolytic condenser connected to an alternating-current supply circuit comprising a plurality of main electrodes, and an auxiliary electrode, all immersed in a suitable electrolyte, of a plurality of transformers, the primary winding of one of which is connected to one of the main electrodes, the primary winding of the other is connected in parallel relation to the supply circuit, and a plurality of secondary windings, each having a greater number of turns than the respective primary windings, connected in series with each other and to the auxiliary electrode and to the same side of the supply circuit as the primary winding which is connected to the main electrode.

9. The combination with an electrolytic condenser connected to an alternating-current supply circuit, of means for maintaining a substantially constant capacitance in the condenser, said means including means for changing the value of the potential impressed upon an auxiliary electrode of the condenser, responsive to a change in the ratio of the alternating potential impressed upon the condenser to the current flowing into the electrodes.

In testimony whereof, I have hereunto subscribed my name this 29th day of December, 1919.

JOSEPH SLEPIAN.